US006609706B2

(12) United States Patent
Shibata

(10) Patent No.: US 6,609,706 B2
(45) Date of Patent: Aug. 26, 2003

(54) WORK FIXING JIG FOR MACHINE TOOLS

(75) Inventor: Hidetaka Shibata, Aichi (JP)

(73) Assignee: Okuma Corporation, Aichi (JP)

( * ) Notice: Subject to any disclaimer, the term of this patent is extended or adjusted under 35 U.S.C. 154(b) by 0 days.

(21) Appl. No.: 10/114,934

(22) Filed: Apr. 4, 2002

(65) Prior Publication Data

US 2002/0145243 A1 Oct. 10, 2002

(30) Foreign Application Priority Data

Apr. 5, 2001 (JP) ....................................... 2001-106910

(51) Int. Cl.[7] .................................................. B23Q 3/00
(52) U.S. Cl. ......................................... 269/91; 269/100
(58) Field of Search ............................... 269/91–94, 99, 269/100, 25, 20, 900, 305, 315, 98.1, 32; 29/263

(56) References Cited

U.S. PATENT DOCUMENTS

| | | | | |
|---|---|---|---|---|
| 4,186,916 A | * | 2/1980 | Varga | 269/303 |
| 5,129,637 A | * | 7/1992 | Ito et al. | 269/900 |
| 6,042,096 A | * | 3/2000 | MacLean | 269/99 |
| 6,105,951 A | | 8/2000 | Shibata | |

* cited by examiner

*Primary Examiner*—Robert C. Watson
(74) *Attorney, Agent, or Firm*—Jacobson Holman PLLC

(57) ABSTRACT

A work fixing jig for machine tools is attached to a table of the machine tool utilizing a mount bore formed in a work fixing surface of the table for use in fixing work to the table by work fixing means. The jig comprises a jig main body, a generally cylindrical engaging member attached to the jig main body and insertable into the mount bore of the table, a rod movable upward or downward relative to the jig main body and extending through the engaging member, a spring for biasing the rod upward relative to the jig main body, and a cylinder for moving the rod downward against the biasing force of the spring. An elastic ring is fitted around the engaging member for diametrically contracting the lower end portion thereof. The rod has a large-diameter portion for diametrically expanding the lower end portion to bring engaging lugs into engagement with a portion of the table when positioned inside the engaging member. When the large-diameter portion is moved out of the engaging member to therebelow, the elastic force of the ring diametrically contracts the lower end portion of the engaging member to disengage the engaging lugs. Work can be fixed to the table easily with use of the jig.

5 Claims, 5 Drawing Sheets

WORK FIXING JIG FOR MACHINE TOOLS

BACKGROUND OF THE INVENTION

The present invention relates to a jig to be mounted on the work fixing member of a machine tool utilizing a mount bore formed in a work fixing surface of the fixing member for use in fixing work to the fixing member by work fixing means.

Work is fixed to a work fixing surface of a table (work fixing member) of a machine tool conventionally, for example, by an arrangement shown in FIG. 5. With reference to FIG. 5, a table 1 has a plurality of threaded bores 2 extending from a flat upper surface 1*a* (work fixing surface) thereof to a flat lower surface 1*b* thereof. A jig main body 3 in the form of a vertical rod and having screw portions 3*a,* 3*b* at respective opposite ends thereof has its lower screw portion 3*a* screwed in the threaded bore 2 at a suitable position and is fixed to the table 1 with a lock nut 4 screwed on the screw portion 3*a.* A clamp 5 for fixing work W has a threaded bore 5*a* at a base end thereof and a through bore 5*b* at an intermediate portion of the length thereof. An adjusting bolt 6 is screwed in the threaded bore 5*a* from below, and the upper screw portion 3*b* of the jig main body 3 loosely extends through the bore 5*b*. The adjusting bolt 6 has a head 6*a* having a convex lower face. The head 6*a* rests on a concave seat 7 having a concave upper face and provided on the table 1. The clamp 5, adjusting bolt 6 and concave seat 7 provide work fixing means. The work W is fixed to the upper surface 1*a* of the table 1 by placing a forward end of the clamp 5 on the work W as positioned in place on the table 1 and screwing a clamp nut 8 on the upper threaded portion 3*b* of the jig main body 3. The work fixing means comprises the clamp 5, adjusting bolt 6, concave seat 7 and clamp nut 8.

However, in the case where the work W is to be fixed to the upper surface 1*a* of the table 1 as shown in FIG. 5, the lower screw portion 3*b* of the jig main body 3 must be screwed into the threaded bore 2 to a controlled depth by a cumbersome procedure, and a tool is necessary for screwing the lower screw portion 3*b* of the jig main body 3 into the threaded bore 2. Fixing the jig main body 3 to the table 1 therefore requires much time and labor, hence the problem that the overall procedure for fixing the work W is cumbersome.

DISCLOSURE OF THE INVENTION

An object of the present invention is to solve the above problem and to provide a work fixing jig for machine tools by which work can be fixed to the tool more easily than conventionally.

The present invention provides a work fixing jig for machine tools which is to be attached to a work fixing member of the machine tool utilizing a mount bore formed in a work fixing surface of the fixing member for use in fixing work to the fixing member by work fixing means, the jig comprising a jig main body having a contact surface to be brought into intimate contact with the work fixing surface, an engaging member projecting from the contact surface of the jig main body and insertable into the mount bore of the fixing member, the engaging member having an engaging portion releasably engageable with a portion of the fixing member defining an opening of the mount bore opposite to the work fixing surface, a rod movable in directions orthogonal to the contact surface relative to the jig main body, disengaging means provided between the engaging member and the rod for engaging the engaging portion of the engaging member with the opening-defining portion and disengaging the engaging portion from the opening-defining portion by the axial movement of the rod, biasing means provided between the jig main body and the rod for biasing the rod into the engaging movement, and a fluid pressure cylinder provided between the jig main body and the rod for bringing the rod into the disengaging movement against the biasing force of the biasing means.

The term the "mount bore" used above is to be interpreted as including a mount groove.

The work fixing jig of the invention for machine tools is used in the following manner for fixing work in place. A fluid is supplied to one of the fluid compartments of the fluid pressure cylinder to move the rod for disengagement against the biasing force of the biasing means to release the engaging portion of the engaging member from an engaged state. In this state, the engaging member is fitted into the mount bore of the work fixing member. The pressure fluid is then discharged from the fluid compartment of the cylinder, permitting the biasing force of the biasing means to bring the rod into the engaging movement, whereby the engaging portion of the engaging member is brought into engagement with the opening-defining portion of the work fixing member. In this way, the jig main body is fixed to the fixing member for the work fixing means to fix the work in position.

The contact surface of the jig main body is brought into intimate contact with the work fixing surface of the fixing member, whereby the depth to which the engaging member is fitted into the mount bore of the fixing member is determined in accordance with the depth of the mount bore and the length of the engaging member. This eliminates the need to control the depth of fitting. Unlike the conventional case wherein the screw portion of the jig main body is screwed into the threaded bore in fixing the jig main body to the work fixing member, the jig main body of the invention can be fixed to the work fixing member without necessitating any cumbersome procedure. The overall work fixing procedure can therefore be made more simplified than when the conventional jig is used.

The work fixing jig of the invention for machine tools may be so adapted that the engaging member is generally in the form of a hollow cylinder and provided at a forward end portion thereof with the engaging portion engageable with the opening-defining portion of the work fixing member, the end portion providing the engaging portion being diametrically contractable or expandable, the engaging portion being engageable with the opening-defining portion of the work fixing member when said end portion providing the engaging portion is diametrically expanded, the engaging portion being disengageable from the opening-defining portion when said end portion is diametrically contracted, the engaging member having an elastic ring fitted therearound for diametrically contracting said end portion, the rod being inserted through the engaging member, the rod having a large-diameter portion for diametrically expanding said end portion when positioned inside the engaging member, the large-diameter portion permitting said end portion of the engaging member to be diametrically contracted by the elastic force of the elastic ring when moving out of the engaging member.

In this case, the engaging member and the disengaging means become relatively simple in construction.

DESCRIPTION OF THE PREFERRED EMBODIMENT

Figure 1:
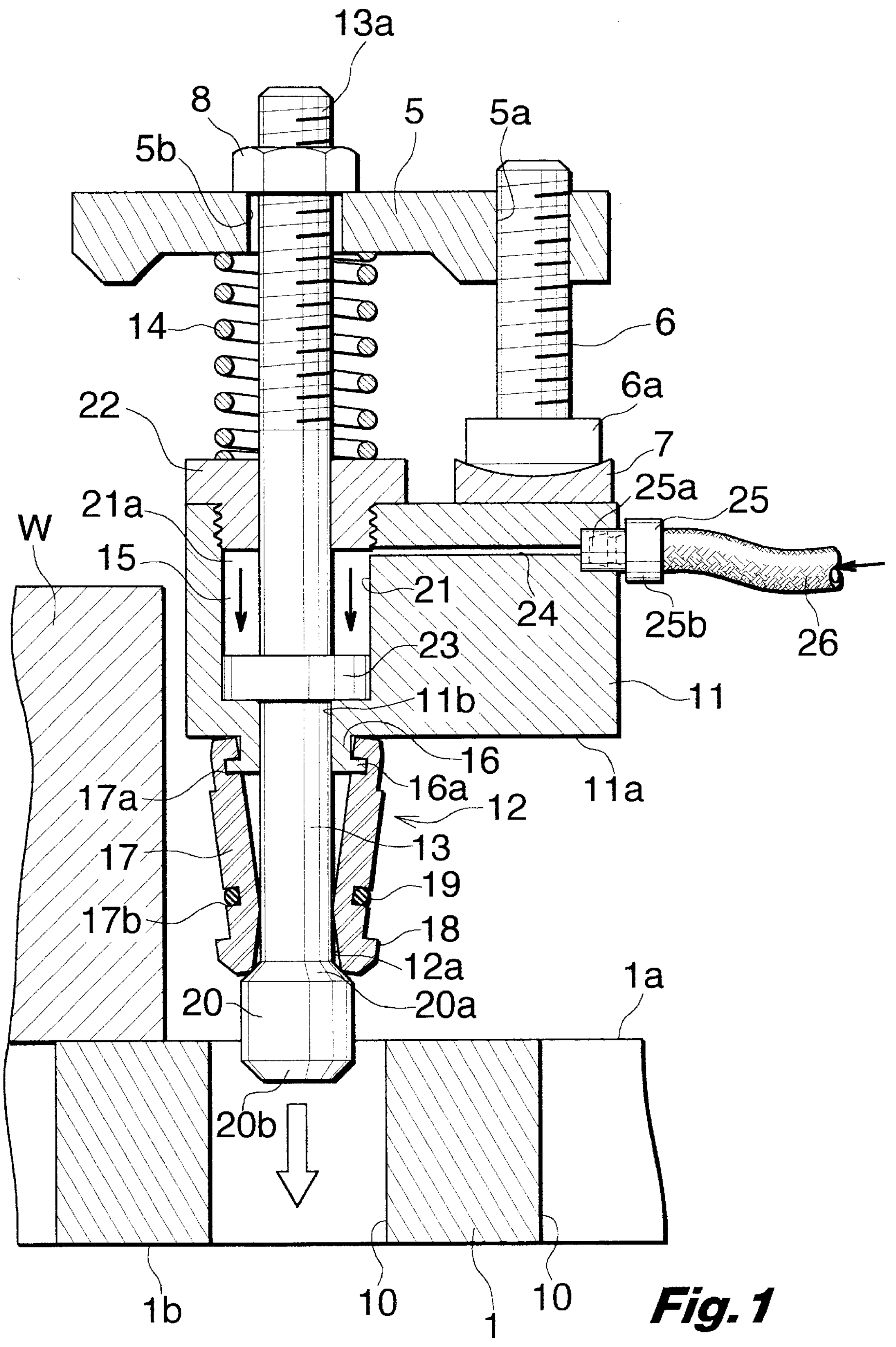
FIG. 1 is a view in vertical section and showing a work fixing jig of the invention before it is attached to a table.
Figure 2:
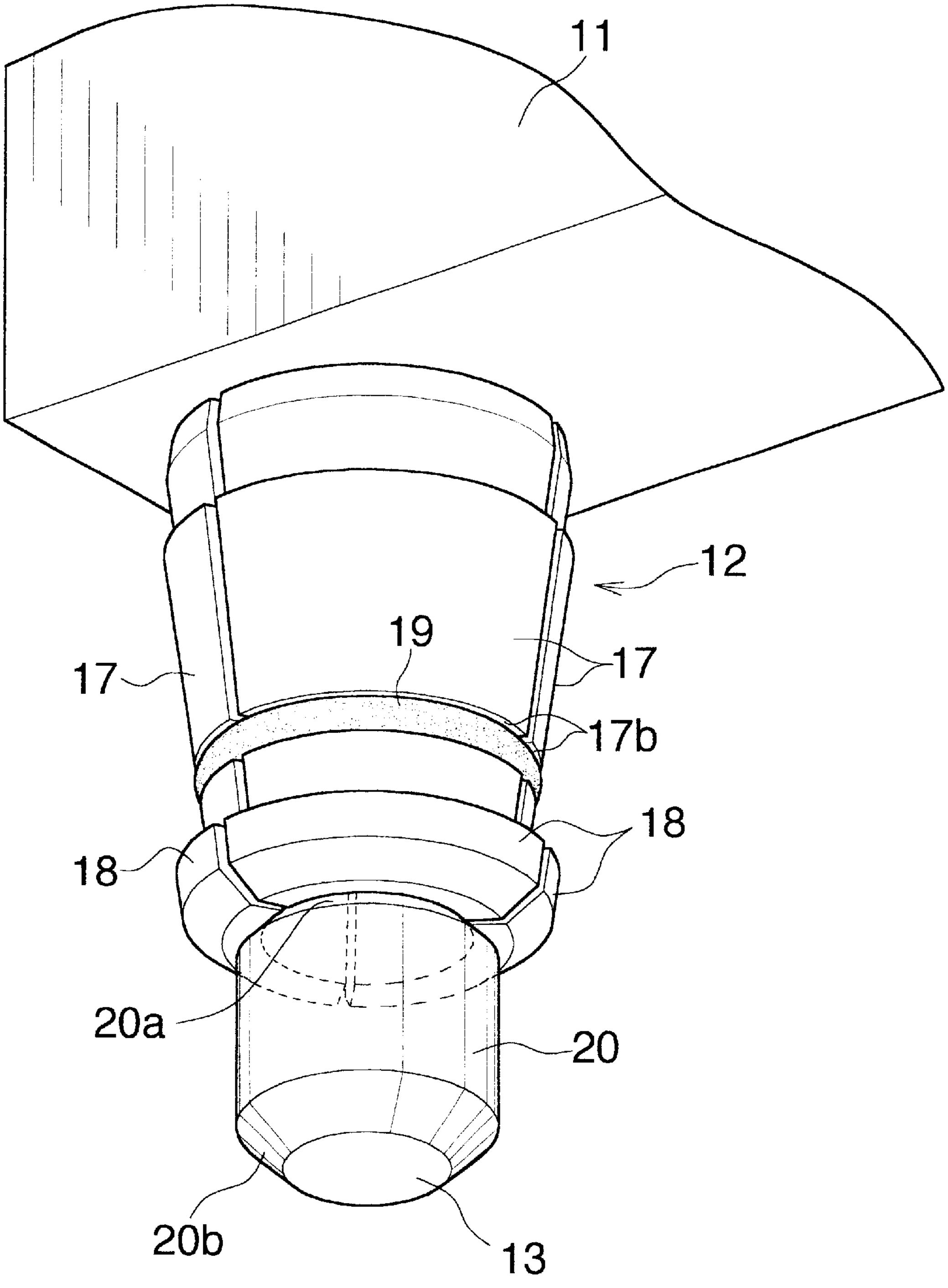
FIG. 2 is a perspective view showing on an enlarged scale an engaging member of the work fixing jig of the invention.
Figure 3:
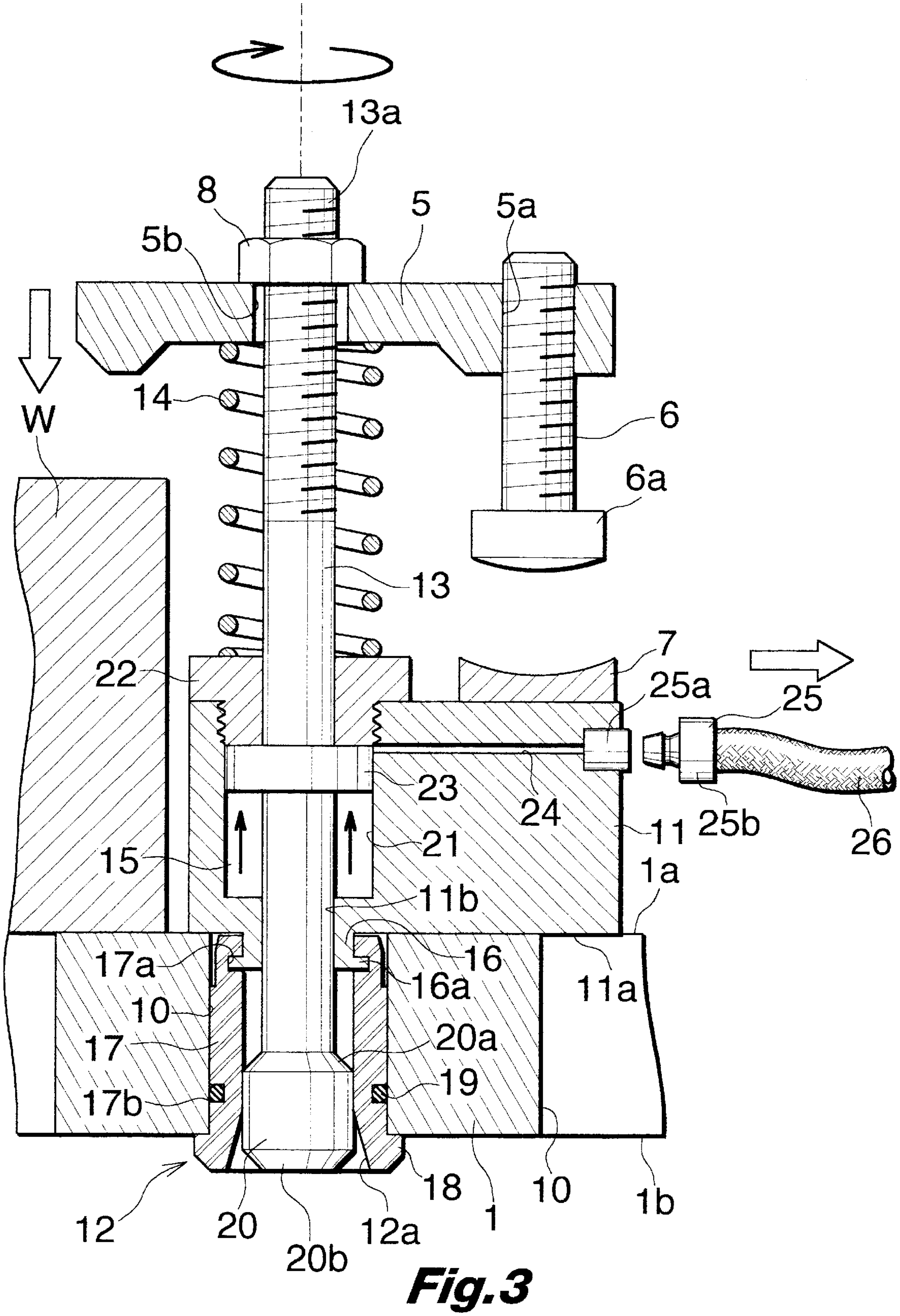
FIG. 3 is a view in vertical section and showing the work fixing jig of the invention as attached to the table.
Figure 4:
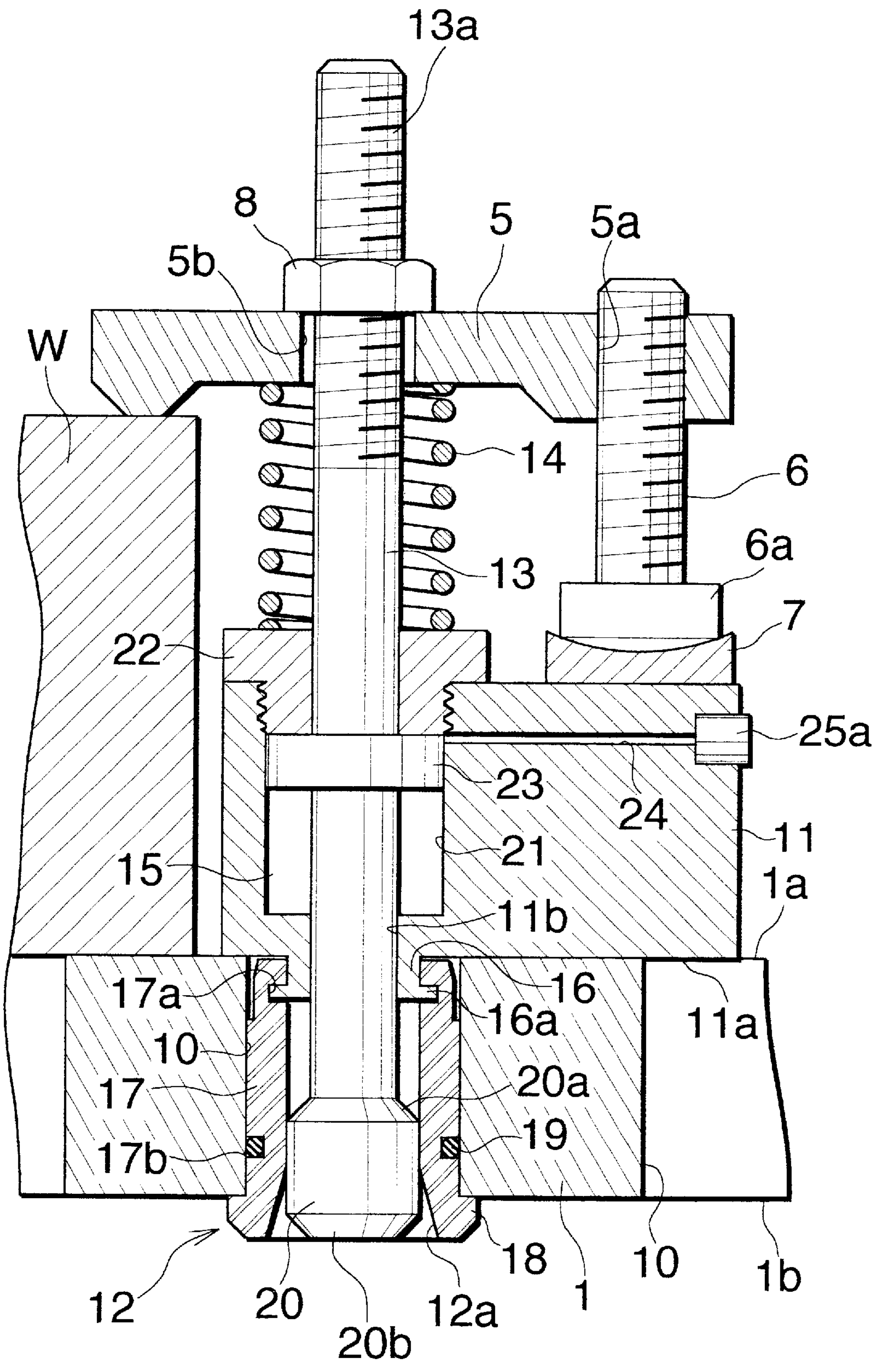
FIG. 4 is a view in vertical section and showing work as fixed to the table by the work fixing jig of the invention.
Figure 5:
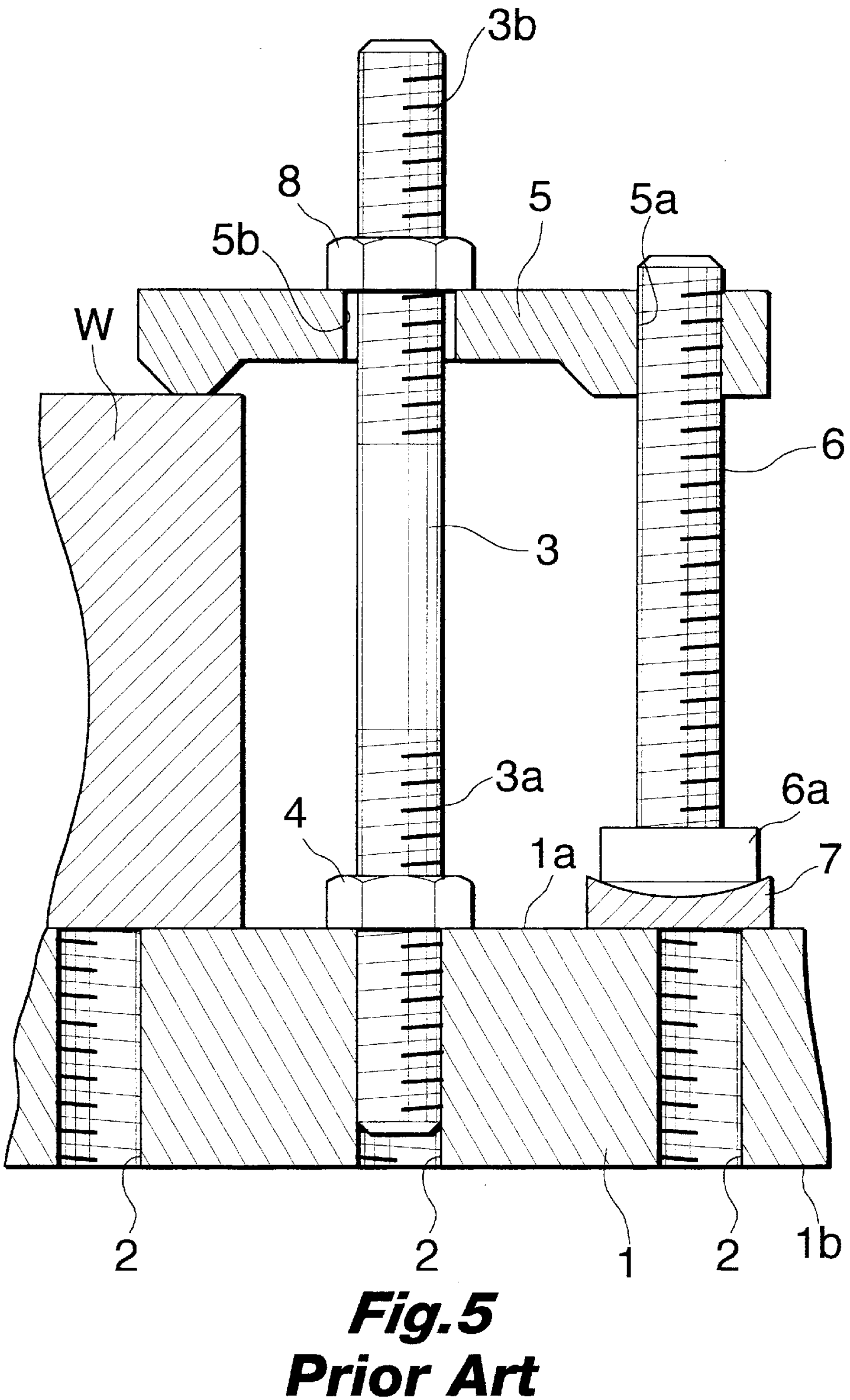
Fig.5 Prior Art
FIG. 5 is a view in vertical section and showing work as fixed to a table by a conventional work fixing jig.

FIG. 1 shows a work fixing jig before it is attached to a table, FIG. 2 shows an engaging member on an enlarged scale, FIG. 3 shows the jig as attached to the table, and FIG. 4 shows work as fixed to the table.

In the following description, the upper and lower sides of FIGS. 1 to 4 will be referred to as upper and lower, respectively. Further throughout the drawings, like parts are designated by like reference numerals.

With reference to FIG. 1, a table 1 has instead of the threaded bores 2 a plurality of cylindrical mount bores 10 extending therethrough from the upper surface 1*a* thereof to the lower surface thereof 1*b*. Utilizing the mount bore 10, the work fixing jig is attached to the table 1. The jig comprises a jig main body 11 in the form of a block and having a flat lower surface 11*a* (intimate contact surface) fittable to the upper surface 1*a* of the table 1 in intimate contact therewith, an engaging member 12 generally in the form of a cylinder and attached to the lower surface 11*a* of the main body 11 in a downwardly projecting manner, a vertical rod 13 extending through the jig main body 11 upwardly and downwardly movably and extending through the engaging member 12 upwardly and downwardly movably, a compression coiled spring 14 (biasing means) for biasing the rod 13 upward relative to the jig main body 11, and a single-acting pneumatic cylinder 15 provided between the jig main body 11 and the rod 13 for moving the rod 13 downward relative to the jig main body 11 against the biasing force of the spring 14.

An annular downward projection 16 is formed on the lower surface 11*a* of the jig main body 11 integrally therewith around a through bore 11*b* for the rod 13 to extend therethrough. The projection 16 is integrally provided with an outward flange 16*a* at its lower end.

As shown in FIG. 2, the engaging member 12 comprises the combination of component pieces 17 each generally in the form of a segment of a hollow cylinder and having an outer periphery of the same curvature as the inner periphery of the mount bore 10, the combination being generally in the form of a hollow cylinder in its entirety. The component pieces 17 have a slightly larger length than the mount bore 10, such that the lower end of the jig main body 11 projects downward beyond the bore 10 when the lower surface 11*a* of the body 11 is brought into intimate contact with the upper surface 1*a* of the table 1. Each component piece 17 has an engaging lug 18 (engaging portion) formed integrally with its lower end and engageable with the inner peripheral portion of lower surface of the table 1 defining the mount bore 10 when the engaging member 12 is inserted into the mount bore 10, with the outer peripheral surfaces of the component pieces 17 in intimate contact with the inner periphery defining the bore 10. The component piece 17 has in the inner surface of an upper end portion thereof a groove 17*a* extending circumferentially of the combination and having the outward flange 16*a* of the downward projection 16 fitted therein. The component piece 17 further has a groove 17*b* extending in the circumferential direction and formed in a lower portion of outer surface thereof. The outward flange 16*a* of the downward projection 16 is fitted into the inner groove 17*a* of all the component pieces 17, and an elastic ring 19 is fitted into the outer grooves 17*b* of the pieces 17, whereby all the component pieces 17 are attached to the jig main body 11 to provide the engaging member 12. The lower end of the engaging member 12 is diametrically contractable or expandable. The elastic ring 19 has the same structure as an O-ring. The curvature of the lower portion of inner surface of each component piece 17 gradually decreases as this portion extends downward, with the result that the lower portion of inner periphery of the engaging member 12 has a tapered surface 12*a* flaring downward with a diameter gradually increasing downward.

The rod 13 has at its lower end a large-diameter portion 20 having an outer periphery with the same curvature as the inner periphery of the engaging member 12. The large-diameter portion 20 has upper and lower faces 20*a*, 20*b* tapered upward and downward respectively. The large-diameter portion 20 projects downward beyond the lower end of the engaging member 12 when the rod 13 is brought to a lower limit position, and has its upper part positioned above the inner peripheral tapered surface 12*a* of the engaging member 12 when the rod 13 is brought to an upper limit position. When the large-diameter portion 20 is projected downward beyond the lower end of the engaging member 12, the engaging member 12 has its lower end portion diametrically contracted by the action of the elastic ring 19, and the engaging lugs 18 are movable through the mount bore 10 in this state (see FIG. 1). When the rod 13 is brought to its upper limit position, the engaging member 12 is diametrically enlarged by the large-diameter portion 20, bringing the outer periphery thereof into intimate contact with the inner periphery of the table 1 defining the mount bore 10 and engaging the lugs 18 with the inner peripheral portion of the table lower surface 1*b* around the bore 10 (see FIG. 3). The rod 13 has at its upper end a screw portion 13*a*, which loosely extends through a clamp 5 at a through bore 5*b*, with a clamp nut 8 screwed on its upper end. The compression coiled spring 14 is fitted around the rod 13, as positioned between the jig main body 11 and the clamp 5.

The pneumatic cylinder 15 is provided between the jig main body 11 and the rod 13 in the following manner. The through bore 11*b* of the jig main body 11 for the rod 13 to extend therethrough is diametrically enlarged except at the bore lower end portion to provide a cylinder chamber 21. The bore 11*b* has an upper-end opening which is closed with a closure 22 screwed in the bore 11*b*. The rod 13 extends through the closure 22 hermetically. A piston portion 23 is provided on the portion of the rod 13 positioned within the cylinder chamber 21. The vertical length of the cylinder chamber 21, i.e., the stroke length of the piston portion 23, is so determined that when the piston portion 23 is brought to its lower limit position, the large-diameter portion 20 projects downward beyond the lower end of the engaging member 12, and that when the piston portion 23 is brought to its upper limit position, the rod 13 has it lower end positioned at the same level as the lower end of the engaging member 12 and has the upper part of its large-diameter portion 20 positioned above the inner peripheral tapered surface 12*a* of the engaging member 12. The jig main body 11 has a pressure air channel 24 having an end opening in the inner periphery of the cylinder chamber 21 immediately under the closure 22 and another end opening in an outer side of the jig main body 11. Attached to the end of the air channel 24 in the outer side of the body 11 is one joint member 25*a* of a removable pipe joint 25 which is termed a snap-in joint. The other joint member 25*b* of the pipe joint 25 is attached to an end of a pressure air supply hose 26. The hose 26 is connected to the jig main body 11 by these joint members 25*a*, 25*b* for supplying pressure air to the air channel 24 through the hose 26. A known joint is used as the removable pipe joint 25, the construction of which therefore will not be described.

Using the work fixing jig of the above construction, the work W is fixed to the table 1 in the following manner.

The work W is placed on the table 1 in advance, as positioned in place with respect to the horizontal direction. First, the hose 26 is connected to the jig main body 11, and pressure air is supplied to an air compartment 21*a* in the cylinder chamber 21 of the pneumatic cylinder 15 above the piston portion 23 to lower the rod 13 to its lower limit position relative to the jig main body 11. This causes the large-diameter portion 20 of the rod 13 to project downward beyond the lower end of the engaging member 12, diametrically contracting the lower end portion of the engaging member 12 (see FIG. 1). The engaging member 12 in this state is inserted into the mount bore 10 at a suitable position, and the lower surface 11*a* of the jig main body 11 is brought into intimate contact with the upper surface 1*a* of the table 1. The supply of pressure air to the air compartment 21*a* of the pneumatic cylinder 15 is then discontinued, and the hose 26 is removed from the jig main body 11, whereupon the rod 13 is raised to its upper limit position relative to the main body 11 by the biasing force of the compression coiled spring 14. At this time, the upper-end tapered face 20*a* of the large-diameter portion 20 of the rod 13 and the tapered surface 12*a* of the engaging member 12 act to permit the large-diameter portion 20 to be inserted into the engaging member 12 smoothly. The pressure air within the air compartment 21*a* escapes through the air channel 24. Upon the rod 13 reaching its upper limit position, the upper outer peripheral part of the large-diameter portion 20 comes into intimate contact with the portion of the inner periphery of the engaging member 20 above its tapered surface 12*a*, diametrically enlarging the lower end portion of the engaging member 12. As a result, the engaging lugs 18 are engaged with the inner peripheral portion of the table lower surface 1*b* around the mount bore 10 to attach the jig to the upper surface 1*a* of the table 1 (see FIG. 3). Finally, the clamp nut 8 is advanced in screw-thread engagement with the rod 13 to place the lower face of the head 6*a* of an adjusting bolt 6 on the upper face of a concave seat 7 on the jig main body 11 and to cause the forward end of the clamp 5 to hold the work W (see FIG. 4). In this way, the work W is fixed to the upper surface 1*a* of the table 1.

The foregoing embodiment has the pneumatic cylinder 15 between the jig main body 11 and the rod 13, whereas a hydraulic cylinder may alternatively be provided. The jig can be attached to the table 1 in the same manner as above in the case wherein the table 1 is provided with mount grooves having a width equal to the diameter of the mount bores 10, instead of the mount bores 10.

What is claimed is:

1. A work fixing jig for machine tools which is to be attached to a work fixing member of the machine tool utilizing a mount bore formed in a work fixing surface of the fixing member for use in fixing work to the fixing member by work fixing means, the jig comprising a jig main body having a contact surface to be brought into intimate contact with the work fixing surface, an engaging member projecting from the contact surface of the jig main body and insertable into the mount bore of the fixing member, the engaging member having an engaging portion releasably engageable with a portion of the fixing member defining an opening of the mount bore opposite to the work fixing surface, a rod movable in directions orthogonal to the contact surface relative to the jig main body, disengaging means provided between the engaging member and the rod for engaging the engaging portion of the engaging member with the opening-defining portion and disengaging the engaging portion from the opening-defining portion by the axial movement of the rod, biasing means provided between the jig main body and the rod for biasing the rod into the engaging movement, and a fluid pressure cylinder provided between the jig main body and the rod for bringing the rod into the disengaging movement against the biasing force of the biasing means.

2. A work fixing jig for machine tools according to claim 1 wherein the work fixing means comprises a clamp fitted around an end of the rod opposite to the engaging member and movable axially of the rod, the clamp having a threaded through bore at one end thereof and a work holding portion at the other end thereof, a concave seat provided on the jig main body and having a concave face opposed to the clamp, and an adjusting bolt screwed in the threaded bore of the clamp from the jig main body side and having a head provided with a convex face, the convex face being opposed to the jig main body and receivable by the concave face of the concave seat.

3. A work fixing jig for machine tools according to claim 1 wherein the engaging member is generally in the form of a hollow cylinder and provided at a forward end portion thereof with the engaging portion engageable with the opening-defining portion of the work fixing member, the end portion providing the engaging portion being diametrically contractable or expandable, the engaging portion being engageable with the opening-defining portion of the work fixing member when said end portion providing the engaging portion is diametrically expanded, the engaging portion being disengageable from the opening-defining portion when said end portion is diametrically contracted, the engaging member having an elastic ring fitted therearound for diametrically contracting said end portion, the rod being inserted through the engaging member, the rod having a large-diameter portion for diametrically expanding said end portion when positioned inside the engaging member, the large-diameter portion permitting said end portion of the engaging member to be diametrically contracted by the elastic force of the elastic ring when moving out of the engaging member.

4. A work fixing jig for machine tools according to claim 1 wherein an inner periphery of the engaging member has at an end portion thereof providing the engaging portion a tapered surface flaring toward an extremity, and the rod has a large-diameter portion provided with opposite end faces tapered toward respective ends thereof.

5. A work fixing jig for machine tools according to claim 1 wherein the mount bore of the work fixing member is cylindrical, and the contact surface of the jig main body is provided with an annular projection around a through bore for the rod to extend therethrough, the annular projection having an outward flange at an outer end thereof, the engaging member comprising the combination of component pieces each generally in the form of a segment of a hollow cylinder and each having an outer peripheral surface of the same curvature as an inner periphery defining the mount bore, the combination being generally in the form of a hollow cylinder in its entirety, each of the component pieces having an engaging portion projecting outward from one end thereof and releasably engageable with the opening-defining portion of the work fixing member, each component piece having a groove formed in an inner peripheral surface thereof at the other end and extending circumferentially of the combination and a groove formed in its outer peripheral surface at a portion thereof close to the engaging portion and extending circumferentially of the combination, the outward flange of the annular projection being fitted in the grooves in the inner peripheral surfaces of all the component pieces and an elastic ring being fitted in the grooves in the outer peripheral surfaces of all the component pieces, whereby an end portion of the engaging member providing the engaging portions is made diametrically contractable or expandable.

* * * * *